United States Patent [19]

Stranieri et al.

[11] Patent Number: 5,087,224
[45] Date of Patent: Feb. 11, 1992

[54] CONTINUOUS SPEED GEAR FUNCTIONING BY MEANS OF COG WHEELS OF VARIABLE RADIUS

[76] Inventors: Maria Stranieri; Dario Dore, both of Via Ponale, 48, 20162 Milan, Italy

[21] Appl. No.: 155,930
[22] PCT Filed: Jan. 14, 1987
[86] PCT No.: PCT/IT87/00001
  § 371 Date: Nov. 30, 1987
  § 102(e) Date: Nov. 30, 1987
[87] PCT Pub. No.: WO87/04681
  PCT Pub. Date: Aug. 13, 1987

[30] Foreign Application Priority Data
  Feb. 10, 1986 [IT] Italy .................. 19355 A/86
  Nov. 27, 1986 [IT] Italy .................. 22470 A/86

[51] Int. Cl.⁵ .................................... F16H 55/52
[52] U.S. Cl. .................................... 474/50; 474/52
[58] Field of Search ............. 474/47, 49, 50, 52-57

[56] References Cited

U.S. PATENT DOCUMENTS

| | | | |
|---|---|---|---|
| 3,956,944 | 5/1976 | Tompkins | 474/50 |
| 3,995,508 | 12/1976 | Newell | 474/50 |
| 4,342,559 | 8/1982 | Williams | 474/50 |
| 4,608,034 | 8/1986 | Reswick | 474/49 |

*Primary Examiner*—Thuy M. Bui
*Attorney, Agent, or Firm*—Guido Modiano; Albert Josif

[57] ABSTRACT

Continuous speed change gear, especially for two-wheeled vehicles, comprising two cog wheels, a cylindrical support for continuously varying, as desired, their center distances, accompanied by radial translation of the cogs of one of the two wheels, the wheels meshing practically with one cog at a time and at least with one cog of the wheel with translatable cogs, so that, with each variation of the center distance there will be continuous variation of the ratio of transmission between the axles of the two wheels.

10 Claims, 4 Drawing Sheets

CONTINUOUS SPEED GEAR FUNCTIONING BY MEANS OF COG WHEELS OF VARIABLE RADIUS

BACKGROUND OF THE INVENTION

Gears for speed changing, namely devices used to vary the speed of transmission between a drive shaft and a driven shaft, are well known.

Speed variation may be made by mating cog wheels fitted with differing numbers of cogs, or by friction systems such as moving transmission belts over bevel gears.

In the first case a high level of efficiency, and high degree of precision are obtained as only rolling friction is determined, but variation is uneven and needs compensating devices such as the clutch in automobile vehicles.

In the second case, as a consequence of the sliding friction necessary between driving and driven parts, much efficiency is lost, parts wear out quickly and operation is irregular.

Specifically in the field of cycles and motorcycles, speed change is made by moving the transmission chain over from one cog wheel to another, using devices which are both complex and delicate.

The types of speed change devices with gears inside the hub have complex structures and are therefore both bulky and costly.

SUMMARY OF THE INVENTION

The above invention eliminates these drawbacks and offers considerable advantages as will be described below.

Subject of the invention is a continuous speed change gear applicable to two-wheeled vehicles in particular, comprising a pair of cog wheels, means for continuous variation, as desired, of their center distances accompanied by a radial translation of the cog of at least one of the pairs of wheels in relation to said variation, means for allowing the two wheels to mesh practically with one cog only, and at least with one cog at a time, on the wheel with translatable cogs.

Therefore, by varying the pitch circle of at least one of the two wheels of each pair, it is possible to obtain continuous variation of their ratio of transmission to the desired value.

The wheel with fixed cogs is placed inside the toothing, facing towards its center, of the wheel with translatable cogs.

In one type of execution the means for varying the center distance between the two wheels of each pair comprise a cylindrical support, translatable in the direction of one of its diameters, around which the wheel with fixed cogs can turn freely.

A circular coaxial cam is fixed to the translatable cylindrical support of the wheel with fixed cogs, having a diameter greater than the external circumference of said wheel but having a lower portion of the circumference, with a smaller radius, passing in the base of the groove between the cogs of said wheel, the beginning of said lower portion being marked by a step then continuing by a join portion to regain the maximum circumference.

The maximum diameter zone of the cam prevents meshing between the two wheels of each pair while the lower zone, when a cog on the wheel with translatable cogs presents itself, permits quick meshing with a groove in the wheel of fixed cogs followed by expulsion of the translatable cog to allow the following one to mesh.

In one kind of execution cogs on the wheel with fixed cogs are saw type.

In one kind of execution the wheel with translatable cogs consists of a disk in which there are radial slots and along these sliders move, having outwardly projecting cogs pushed towards the center of the wheel by elastic means.

The invention includes means for automatically varying the ratio of transmission with variation of the load.

Said means essentially consist of movement mechanisms for setting up components of forces generated by the load opposing the forces of reaction set up by the elastic means.

Therefore, as the load varies, according to whether said components overcome the forces of reaction or are overcome by them, a gradual variation takes place in the center distance between the wheels of each pair such as will respectively reduce or multiply the ratio of transmission.

In one type of execution the wheel with translatable cogs is fixed to the back wheel of a bicycle, or similar vehicle, while the chain that transmits pedal crank movement is applied to a sprocket wheel fixed to the wheel with fixed toothing.

The cylindrical support of the latter wheel can translate on runners fixed to the pin of the bicycle's back wheel.

Said translatable support is driven by a special system of levers or by an automatic means sensitive to variations in the load.

In one type of execution the automatic means essentially consists of springs or of elastic means generally, placed between a bridge fixed to the pin of the bicycle's back wheel and a plane situated on the cylindrical support of the wheel with fixed cogs.

Said springs tend to push the cog wheel upwards, and therefore its meshing zone as well situated below the center of rotation of the wheel with translatable cogs. The downward component of the forces created by chain pull, when a certain value is exceeded, therefore overcomes spring reaction causing the meshing zone to move gradually towards the outer edge of the wheel with translatable cogs, progressively reducing the ratio of transmission.

BRIEF DESCRIPTION OF THE DRAWINGS

The characteristics and purposes of the invention will be made even clearer by the following examples of its execution illustrated by drawings.

DESCRIPTION OF THE PREFERRED EMBODIMENTS

Figure 1:
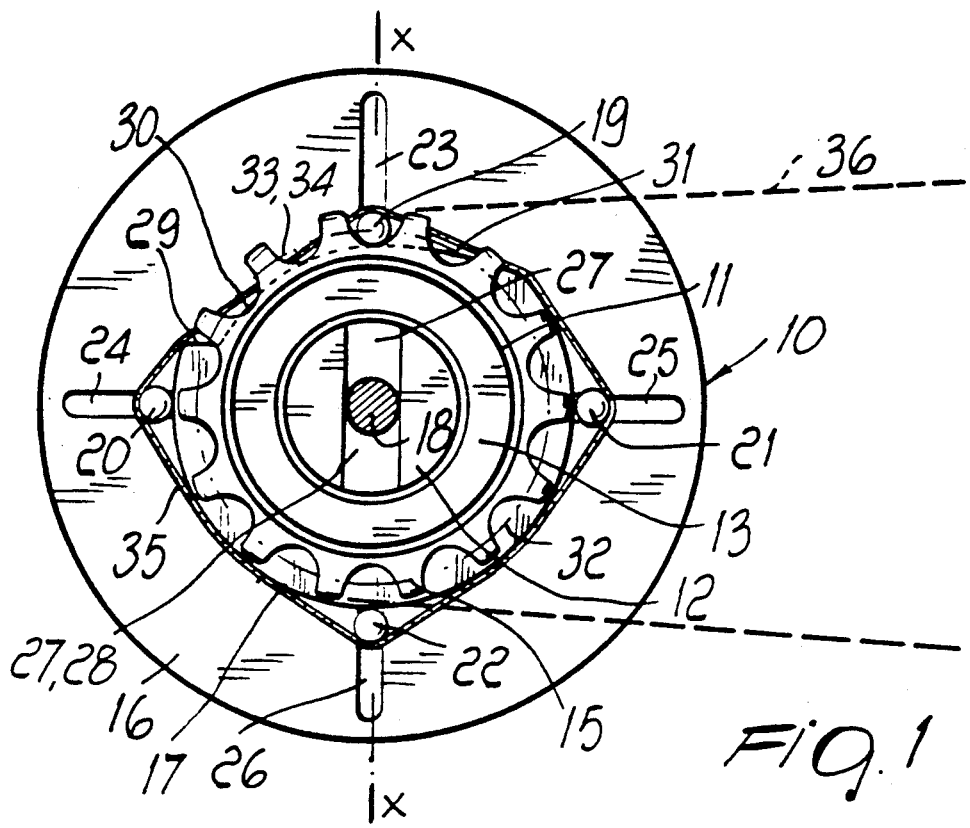
FIG. 1 The speed change gear seen from the front.

The gear 10 comprises a cylindrical ring 11 rotating freely on a cylindrical support 12 by means of a roller bearing 13.

Sprocket wheel 14 and cog wheel 15 are fixed to the ring 11. The circular, coaxial cam 17 is fixed to the support 12, cam diameter being greater than that of the outer circumference of the cog wheel 15, the cam being adjacent to said wheel though allowing it to rotate freely.

In FIG. 1 the sprocket wheel 14 is not seen to allow a view of the cog wheel 15.

The group formed by the ring 11, the support 12 and the cam 17 is adjacent to the cog wheel 16 rotating on the shaft 18, the cogs of said wheel consisting of cylindrical pins 19, 20, 21, 22 fixed to sliding means, omitted for simplicity in the figures, radially translatable in the radial slots 23, 24, 25, 26.

The elastic ring 35 pushes the translatable cogs 19-22 towards the axle of the wheel 16.

The support 12 and the cam 17 respectively present diametral slots 27, 28, of practically the same amplitude, through which the shaft 18 of wheel 16 passes freely.

In the cam 17 there is a lower arched zone 30, whose radius is less than the radius of the circumference passing through the bottom of the groove 32 between the cogs of the cog wheel 15, said zone beginning with a step 29 and terminating by a join portion 31 that regains the maximum circumference.

Means not shown permit and guide translation of the support 12 together with the cam 17 along the XX axis of the above mentioned slots 27, 28 fixing them in the position corresponding to the desired ratio of transmission.

In FIG. 1 the ratio of transmission is 1:1 as shown by coincidence of the pitch circle 33 of the cog wheel 15 with pitch circle 34 of wheel 16.

Figure 3:
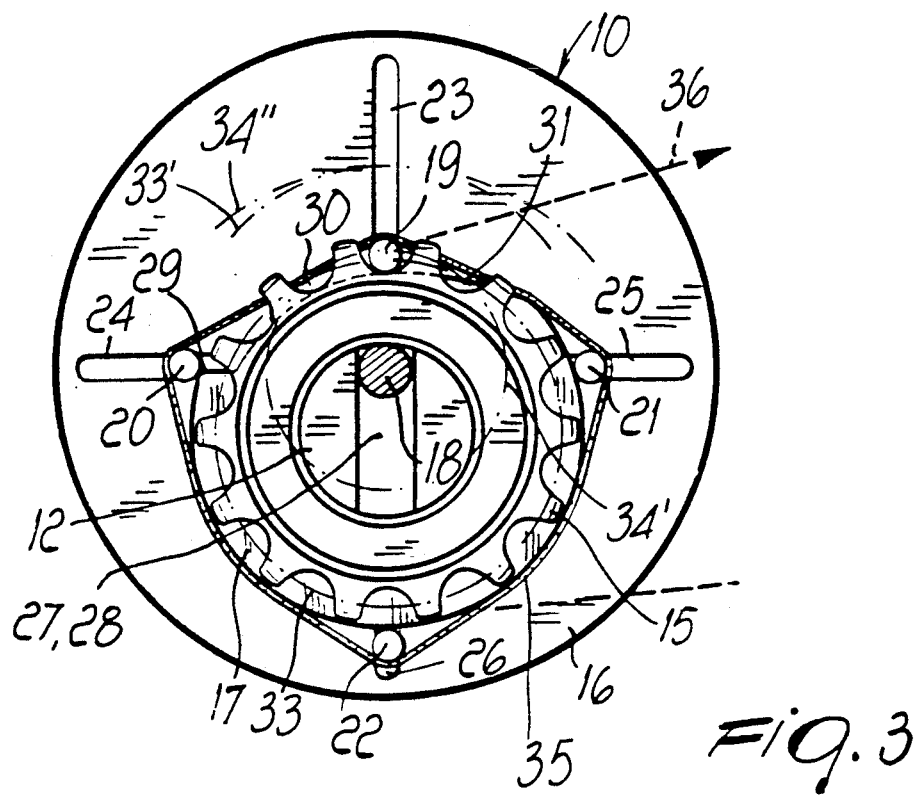
FIG. 3 The speed change gear as it is when ratio of transmission is highest.
Figure 4:
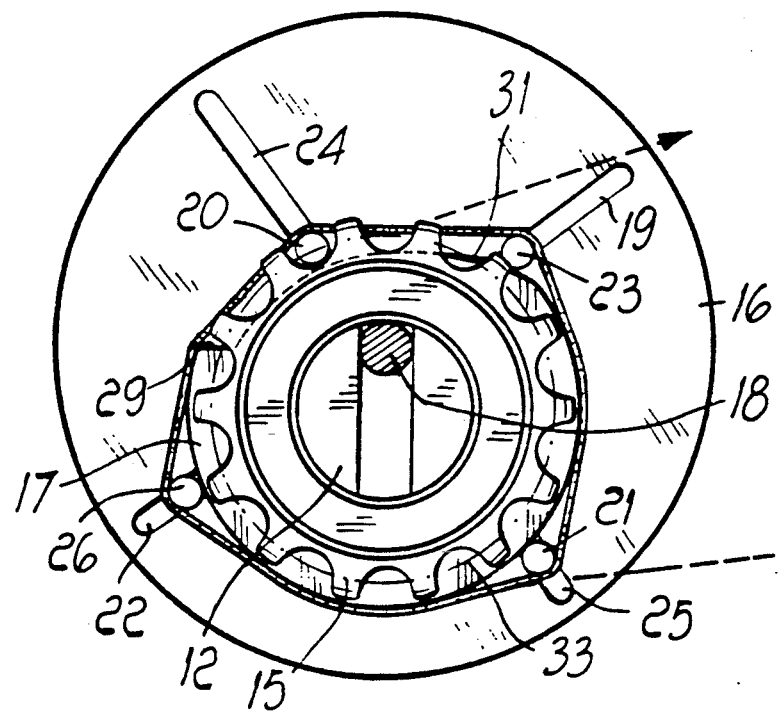
FIG. 4 The speed change gear in another phase of its movement.

By making the support 12 translate to the position in FIG. 3, the pitch circle 34 of the wheel 16 becomes 34' and the ratio of transmission about 2:1.

Figure 2:
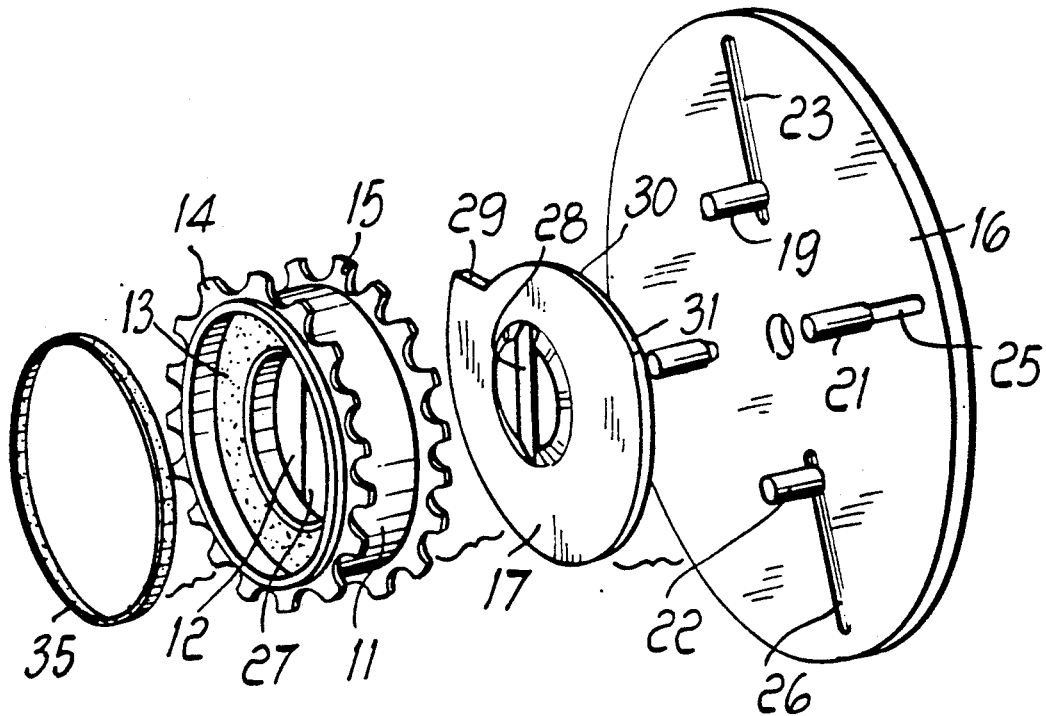
FIG. 2 An exploded view of the speed change gear.

Due to the pull exerted by the chain 36 on sprocket wheel 14, fixed to cog wheel 15 by the ring 11, FIG. 2, in rotating this latter wheel drags wheel 16 into rotation by means of the cog 19.

During the movement this latter cog, rising to that part of the cam 17 fixed to support 12, emerges from the groove in the opposing cogs while cog 20, passing beyond the step 29 cut in the cam 17, moves into the lowered zone 30, fitting into a fresh groove in the cog 15 and taking the place of cog 19.

By continuing the movement a fresh cog 22 will take the place of cog 20, and so on.

It is clear that a different position assumed by the support 12 in relation to the wheel 16 will vary the ratio of trasmission. For example, by moving the support 12 to a position opposite, in relation to the shaft 18, that shown in FIG. 3, and that is upwards, the ratio of transmission will be about 3:4 as appears in FIG. 3 from the corresponding pitch circle 34' and from the pitch circle 33' of the cog wheel 15 whose diameter remains constant.

Figure 5:
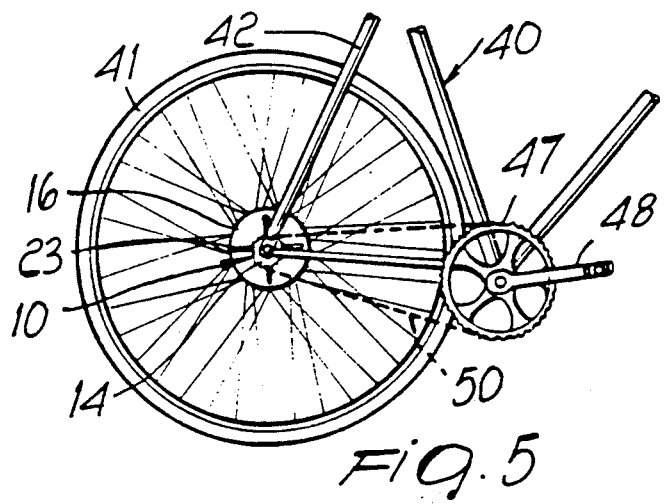
FIG. 5 The speed change gear mounted on a bicycle, seen partially.
Figure 6:
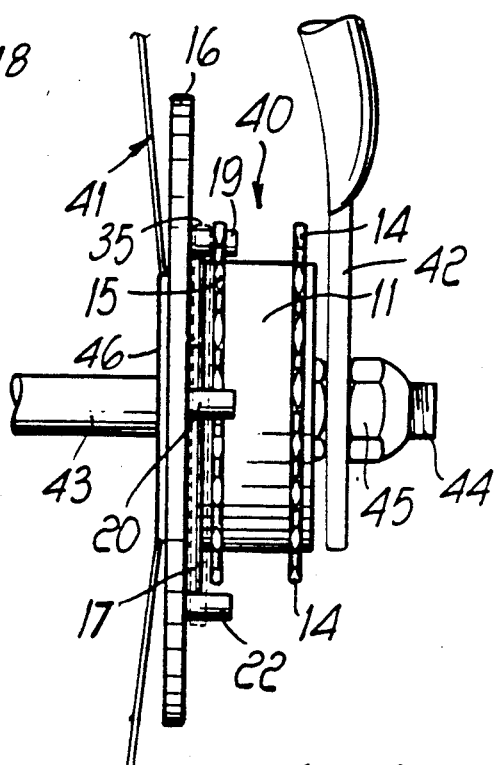
FIG. 6 Partial back view of the bicycle in FIG. 5.

FIGS. 5 and 6 show how the speed change 10, already described, is applied to a bicycle 40, its back wheel 41 being supported by the fork 42 and pin 43 with threading 44 and bolts 45.

The wheel 16 is fixed to the hub 46 of the bicycle wheel 41 while the support 12 is fixed to the fork 42, by means omitted for simplicity, in the position corresponding to the desired ratio.

The sprocket wheel 14 is connected, by means of a chain 50, to the sprocket wheel 47 fixed to the pedal crank 48.

Using means omitted for simplicity, the rider of the vehicle can, by moving the support 12 in relation to the shaft 43, gradually and continuously vary the ratio of transmission.

Figure 7:
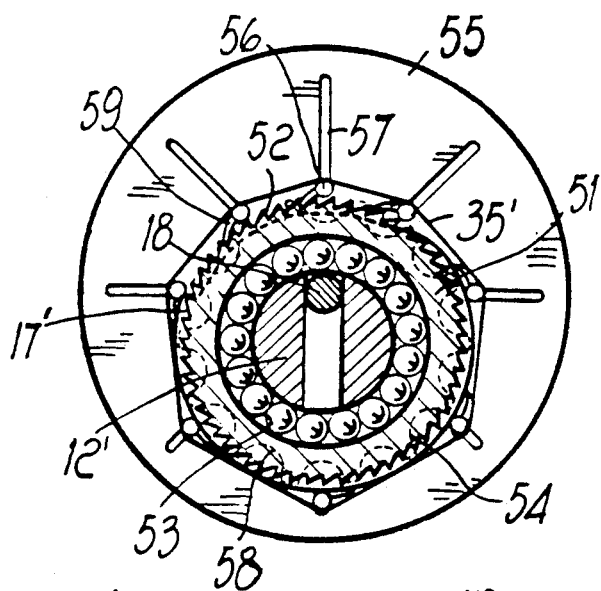
FIG. 7 Gear with hook-shaped cogs.

FIG. 7 illustrates a variant which consists in adoption of a cog wheel 51, having saw teeth 52, fixed to a ring 53 abole to rotate freely on the support 12' equivalent to that in the preceding figures, on roller means 54.

Said cog wheel 51 meshes with the cogs of the wheel 55 whose translation is similarly controlled by the cam 17'. Said cogs are formed of pins 56 mounted onto sliding means, omitted in the figure, which slide in the slots 57, each pin being supplied with a hook 59 held against the cog wheel 51 by springs.

The cog wheel 58 for chain transmission, as indicated by a dotted line, is fixed to the ring 53.

This variant makes it possible to "freewheel" the vehicle.

The elastic ring 35' pushes the pins 56 towards the center of the wheel 55.

Figure 8:
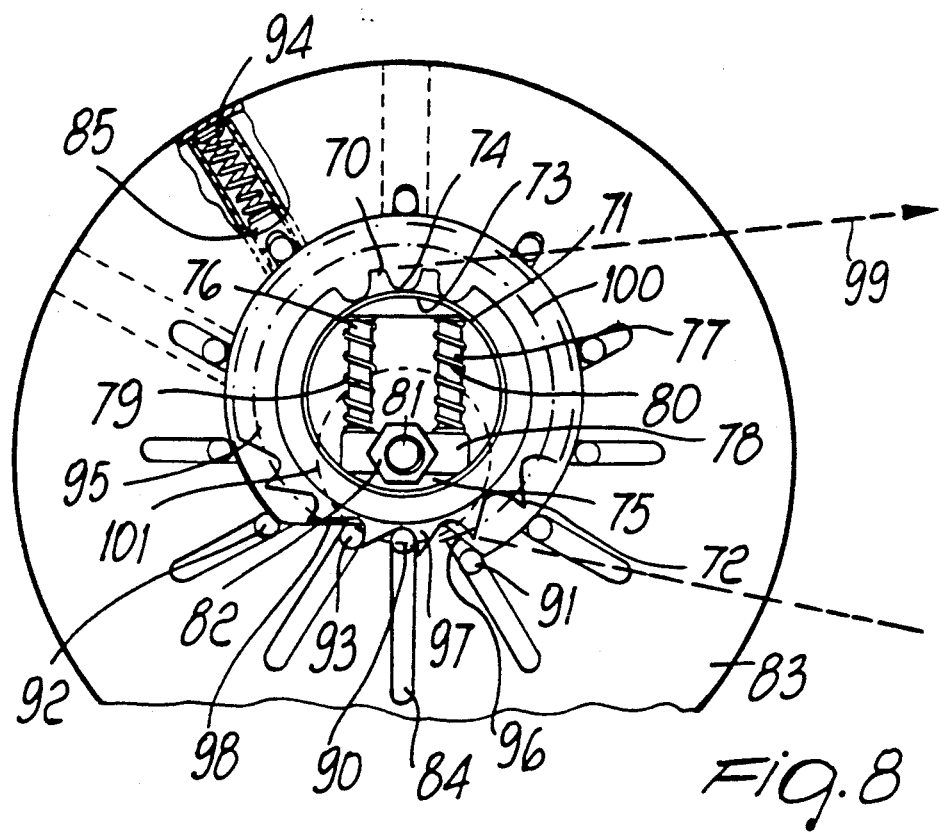
FIG. 8 Gear mounted on a bicycle, with automatic variation of the ratio of transmission according to the load, front view.
Figure 9:
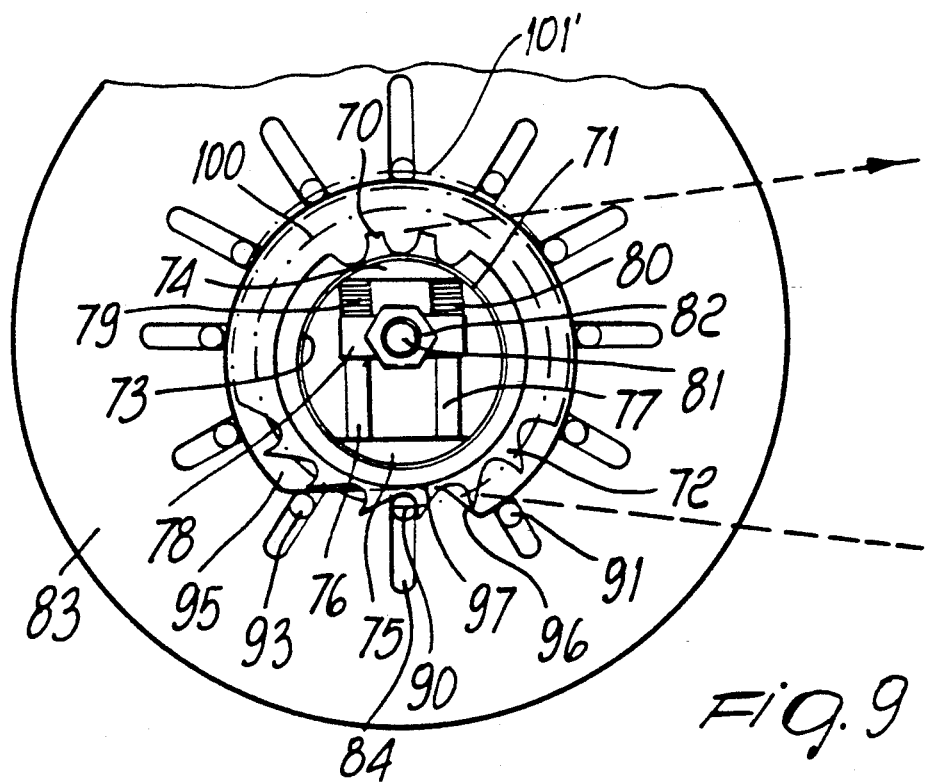
FIG. 9 The gear in FIG. 8 as it is when load is greatest.

FIGS. 8 and 9 illustrate and application particularly suitable for bicycles and motorcycles, but also clearly suited to a great many other applications as well.

The sprocket wheel 70 is fixed to the saw-toothed wheel 72 by means of the ring 71.

Said ring can rotate freely in relation to the cylindrical support 73 comprising the counterposed planes 74,75 for the parallel columns 76,77 on which the bridge 78 slides.

Rotation takes place on a bearing, placed coaxially to the saw-toothed wheel 72, said bearing being invisible as it is covered by the wheel 70 of smaller diameter.

Compression springs 79,80 are mounted between the bridge 78 and the support 74.

The bridge 78 can be applied by bolts 82 to the threaded end of the shaft 81 supporting the back wheel of the bicycle.

The discoid wheel 83 rotates freely round the shaft 81 and is fixed to the back wheel of the bicycle.

It follows from the foregoing that the two wheels 72,83 realize the variable ration of transmission continously in the same way as the counterposed cog wheels 15,16 do in the first example described (FIGS. 1-4).

Clearly visible in the wheel 83 are the radial slots 84 in which the cogs 90,91,92,93, and others, move pushed by compression springs, like 94.

Cam 95, substantially similar to cam 17 in the preceding examples, comprises the step 96 and zone 97 of a radius small than the radius of the circumference passing through the grooves of the saw-toothed wheel 72.

By means of the pedal crank and related sprocket wheel, omitted from the figure, and by means of the chain 99, the wheel 70 is drawn in the direction indicated by the arrows, drawing in turn the saw-toothed wheel 72 on which the radially translating cogs of wheel 83 engage one after the other causing said wheel 83 to rotate and, with it, the bicycle wheel fixed to said wheel 83.

During the movement cog 90 leaves the groove in the saw-toothed wheel due to the effect exerted on it by the cam, and is replaced by cog 91 while cog 92, passing the join portion 98, moves onto the maximum diameter circumference of the cam concerned, and so on for cog 93 and the following ones.

FIG. 8 illustrates a transmission ratio, between the cog wheel 72 and the wheel 83, equivalent to about 2:1, corresponding to the ratio between the pitch circle 100 of the cog wheel 72 and the pitch circle 101 relative to an engaged cog such as cog 90.

If the bicycle is being ridden uphill the load on the chain 99 obviously increases and therefore a downward force component is created that tends to push the support 73 downwards as well, progressively compressing the springs 79,80.

At maximum load (FIG. 9) the transmission ratio will depend on the ratio between the pitch circle 100 of the cog wheel 72 and the pitch circle 101' corresponding to the engaged cog 90.

Said variation in ratio will be automatic, continuous and in relation to the variation in the load.

Figure 10:
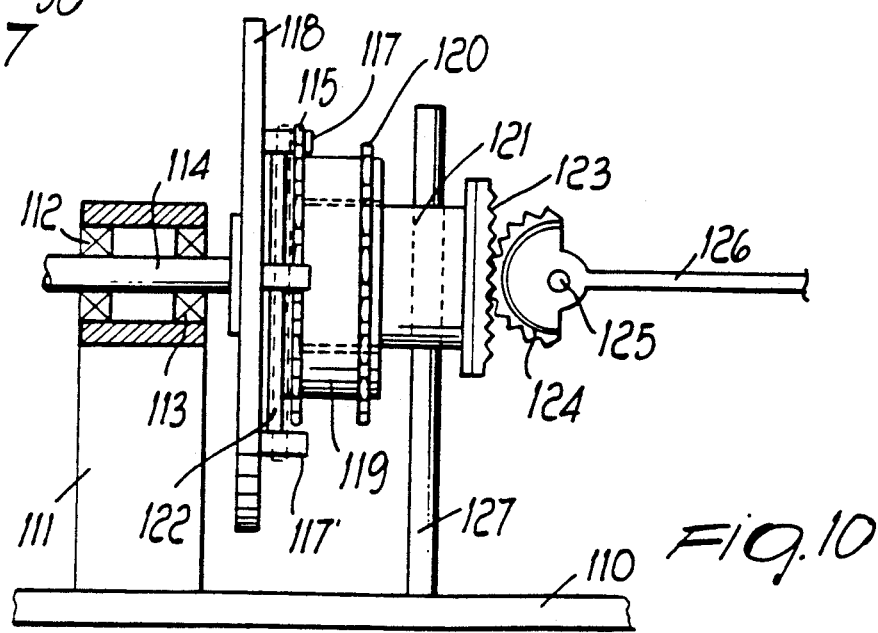
FIG. 10 The gear for fixed installations, side view.

FIG. 10 shows an example of how the speed change already described, especially the one illustrated in FIGS. 1-6, can be used in a fixed installation.

The base 110 supports the frame 111 with bearings 112, 113 for the shaft 114 to which the wheel 118 with radially translating cogs substantially the same as the wheel 16 in the previous example, is fixed.

In said wheel 118 the radial slots support the cogs such as 117, 117' which, one after another, engage the cog wheel 115 fixed to the ring 119 to which the cog wheel 120 is also fixed and is suitable for being driven, by means of a chain, by a drive shaft.

With interposed ball bearing, the ring 119 is supported by the cylindrical body 121 to which the cam 122 is fixed, said cam being practically the same as the cam 17 already described in the preceding example.

Also fixed to said body 121 supported by the column 127 on the base 110 allowing said body to translate vertically, is the vertical rack 123 into which the toothed arc 124, turning round the horizontal shaft 125 and fitted with a manoeuvering lever 126, engages.

Acting on the lever 126, translation may be obtained of the body 121 and therefore variation of the ratio of transmission between the drive shaft and the driven shaft 114.

In all the great many forms of execution possible, the advantages of cog wheel speed change gears can be obtained, as regards sure and precise transmission and efficiency, and the advantages of friction speed change gears as regards continuity in variation of the ratio.

The possibility of obtaining automatic variation of the ratio in accordance with the variation of loads, also ensures further very considerable advantages in some applications like those already explained, for cycles and motorcycles.

Since the applications of the invention have been described as examples only not limited to these, it is understood that every equivalent application of the inventive concepts explained and any product executed and/or in operation according to the characteristics of the invention, will be covered by its field of protection.

We claim:

1. Continuous speed gear, especially for two-wheeled vehicles, comprising a pair of cog wheels, means of continually varying their center distances, as desired, accompanied by radial translation of cogs, of at least one of the two wheels in relation to said variation, means for allowing meshing of the two wheels practically with one cog at a time and at least with one cog of the wheel with translatable cogs to obtain, by varying a pitch circle of at least one of the two wheels of each pair, continuous variation of their ratio of transmission to the desired value.

2. Continuous speed gear, especially for two-wheeled vehicles, as in claim 1, wherein the wheel with fixed cogs is placed inside the toothing, turned towards its center, of the wheel, with translatable cogs.

3. Continuous speed gear, especially for two-wheeled vehicles, as in claim 1, wherein the means for varying the center distance between the two wheels of each pair comprise a cylindrical support, translatable in the direction of one of its diameters, around which the wheel, with fixed cogs can rotate freely.

4. Continuous speed gear, especially for two-wheeled vehicles, as in claim 3, wherein a circular coaxial cam is fixed to the cylindrical translatable support of the wheel with fixed cogs, said cam having a diameter greater than that of the external circumference of said wheel but having a lower zone of a radius less than the radius of the circumference passing through a bottom of a groove between the cogs of said wheel, said lower zone beginning with a step, and terminating with a join portion, the maximum diameter zone of the cam preventing meshing between the two wheels of each pair, but the lower zone, when a translatable cog, on the wheel with translatable cogs, presents itself, allowing quick meshing with a groove in the wheel with fixed cogs, followed by expulsion to permit meshing with a successive translatable cog.

5. Continuous speed gear, especially for two-wheeled vehicles, as in claim 1, wherein the toothing of the wheel with fixed cogs is of the saw type.

6. Continuous speed gear, especially for two-wheeled vehicles, as in claim 1, wherein the cogs of the wheel with translatable cogs, are pushed towards its center by elastic means.

7. Continuous speed gear, especially for two-wheeled vehicles, as in claim 1, wherein the wheel with translatable cogs consists of a disc comprising radial slots in which sliding means slide, carrying outwardly projecting cogs, pushed towards the center of the wheel by elastic means.

8. Continuous speed gear, especially for two-wheeled vehicles, as in claim 1, wherein means are provided for automatically varying the ratio of transmission as the load varies, said means essentially consisting of movement mechanisms that create components of the forces generated by the load opposed to the forces of reaction set up by elastic means, so that, as the load varies, according to whether said components overcome the forces of reaction or are overcome by them, a gradual variation takes place in the center distance between the wheels of each pair such as respectively to reduce or multiply their ratio of transmission.

9. Continuous speed gear, especially for two-wheeled vehicles as in claim 1, wherein the wheel with translatable cogs is mounted on the back wheel of a bicycle and similar vehicles, while a chain that transmits the movement created by a pedal crank is applied to a sprocket wheel fixed to the wheel with fixed cogs, a cylindrical support of this latter wheel being able to translate on runners fixed to a pin, of the back wheel of the bicycle, said support being controlled by a special system of levers or by automatic means sensitive to variations in the load.

10. Continuous speed gear, especially for two-wheeled vehicles as in claim 9, wherein the automatic means consists essentially of springs or elastic means generally, situated between a bridge fixed to the pin of the back wheel of a bicycle, and a plane situated on the cylindrical support of the wheel with fixed cogs, said springs tending to push upwards the cog wheel and therefore its meshing zone placed below the center of rotation of the wheel with translatable cogs so that the downward component of the forces created by the pull exercized by the chain, when a certain value is exceeded, overcomes the reaction of the springs bringing about passage of the meshing zone towards the periphery of the wheel with translatable cogs, progressively reducing the ratio of transmission.

* * * * *